United States Patent [19]

Rapp, Jr. et al.

[11] 4,062,346

[45] Dec. 13, 1977

[54] SOLAR COLLECTOR UNIT

[75] Inventors: Felix Rapp, Jr., Marlboro; James M. Barron, Framingham, both of Mass.

[73] Assignee: DIY-Sol, Inc., Marlboro, Mass.

[21] Appl. No.: 708,871

[22] Filed: July 26, 1976

[51] Int. Cl.² .............................................. F24J 3/02
[52] U.S. Cl. ................................... 126/270; 237/1 A
[58] Field of Search ................ 126/270, 271; 237/1 A

[56] References Cited

U.S. PATENT DOCUMENTS

| | | | |
|---|---|---|---|
| 2,213,894 | 9/1940 | Barry | 126/271 |
| 2,553,073 | 5/1951 | Barnett | 126/271 |
| 2,680,437 | 6/1954 | Miller | 126/270 |
| 3,254,643 | 7/1966 | Thomason | 126/271 |
| 3,866,285 | 2/1975 | Clark | 126/271 |
| 3,902,474 | 9/1975 | Pyle | 237/1 A |
| 3,951,129 | 4/1976 | Brantley, Jr. | 126/271 |
| 3,961,619 | 6/1976 | Estes et al. | 126/271 |
| 4,011,856 | 3/1977 | Gallagher | 126/271 |

Primary Examiner—John J. Camby
Assistant Examiner—Henry C. Yuen
Attorney, Agent, or Firm—Joseph S. Iandiorio

[57] ABSTRACT

A solar collector unit including a corrugated absorber element coated with a reflectively selective coating; a plurality of thin, low mass, low thermal conductivity, thermal isolating elements for supporting the absorber element; and an insulation medium spaced from and generally parallel to the absorber element and disposed on a first side of the absorber element; a reflector surface carried on said insulation medium between said first side and the medium; and an inner transparent insulating sheet spaced from and generally parallel to the absorber element disposed on the second side of the absorber element for transmitting solar radiation to the absorber element and suppressing heat loss.

8 Claims, 7 Drawing Figures

SOLAR COLLECTOR UNIT

FIELD OF INVENTION

This invention relates to a solar collector unit to a solar collector system formed of a plurality of said units.

BACKGROUND OF INVENTION

Current installed costs of most solar heating systems are quite high, often in the range of twenty to thirty-five dollars per square foot. The solar collector is typically the most sophisticated part of such systems and requires great care and skill in fabrication and installation to insure efficient operation. Often the materials and techniques used to construct solar collectors are quite expensive and construction is best carried out at a special fabrication site, rather than at the installation site. In addition, some solar collectors tend to be large and heavy, which makes them difficult to maneuver and install and causes them to suffer from significant thermal lag: the delay of the collector in reaching a particular temperature. There is a constant need for improving heat transfer between the collector and heat-carrying fluid and thermal insulation between the collector and the surrounding environment.

SUMMARY OF INVENTION

It is therfore an object of this invention to provide an improved, simplified and relatively inexpensive solar collector unit.

It is a further object of this invention to provide such a unit which is simple and easy to install, which is less than a third the cost of most present collectors, and which can be constructed and installed by unskilled persons using readily obtainable, inexpensive building supplies.

It is a further object of this invention to provide such a unit which has improved heat transfer from the absorber element to the heat-carrying fluid and improved suppression of heat transfer from the collector to the surrounding environment.

It is a further object of this invention to provide such a unit which is extremely efficient and economical and which in a relatively small space, generally two hundred square feet of collector area, may provide approximately forty percent of the space and hot water heating for a conventional house at 42° N latitude.

The invention features a solar collector unit comprising a corrugated absorber element with a reflectively selective coating. There are thin, low mass, low thermal conductivity thermal isolating elements for supporting the absorber element, and an insulation medium is in a position spaced from and generally parallel to the absorber element on a first side of the absorber element.

There is a reflector surface carried on the insulation medium between the first side and the insulation medium. An inner transparent insulating sheet is spaced from and oriented generally parallel to the absorber element on the second side of the absorber for transmitting solar radiation to the absorber element and suppressing heat loss.

In preferred constructions, the solar collector unit includes a pair of side members disposed one along each longitudinal edge of the absorber element for mounting the thermal isolation elements and the transparent insulation sheet. There also may be included a cold air input manifold for introducing cold air to be heated to the absorber element, and a warm air output manifold for collecting heated air from the absorber element. A second outer transparent insulating sheet may be provided spaced from and generally parallel to the inner sheet and farther from the absorber element than the inner sheet. The cold air input manifold may include a long, narrow input slot for producing a smooth laminar flow along the inside of the inner transparent sheet and along the reflector surface to provide an insulating barrier between the hotter turbulent air flow proximate the absorber element and the inner transparent sheet and reflector surface, and reducing transfer of heat between that turbulent air flow and laminar flow.

In a preferred embodiment a plurality of solar collector units are assembled to form a solar collector system in which longitudinally abutting absorber elements are disposed with their corrugations staggered relative to each adjacent absorber element for promoting turbulent air flow in the corrugations.

Other objects, features and advantages will occur from the following description of a preferred embodiment and the accompanying drawings, in which.

Figures 1, 2, 3:
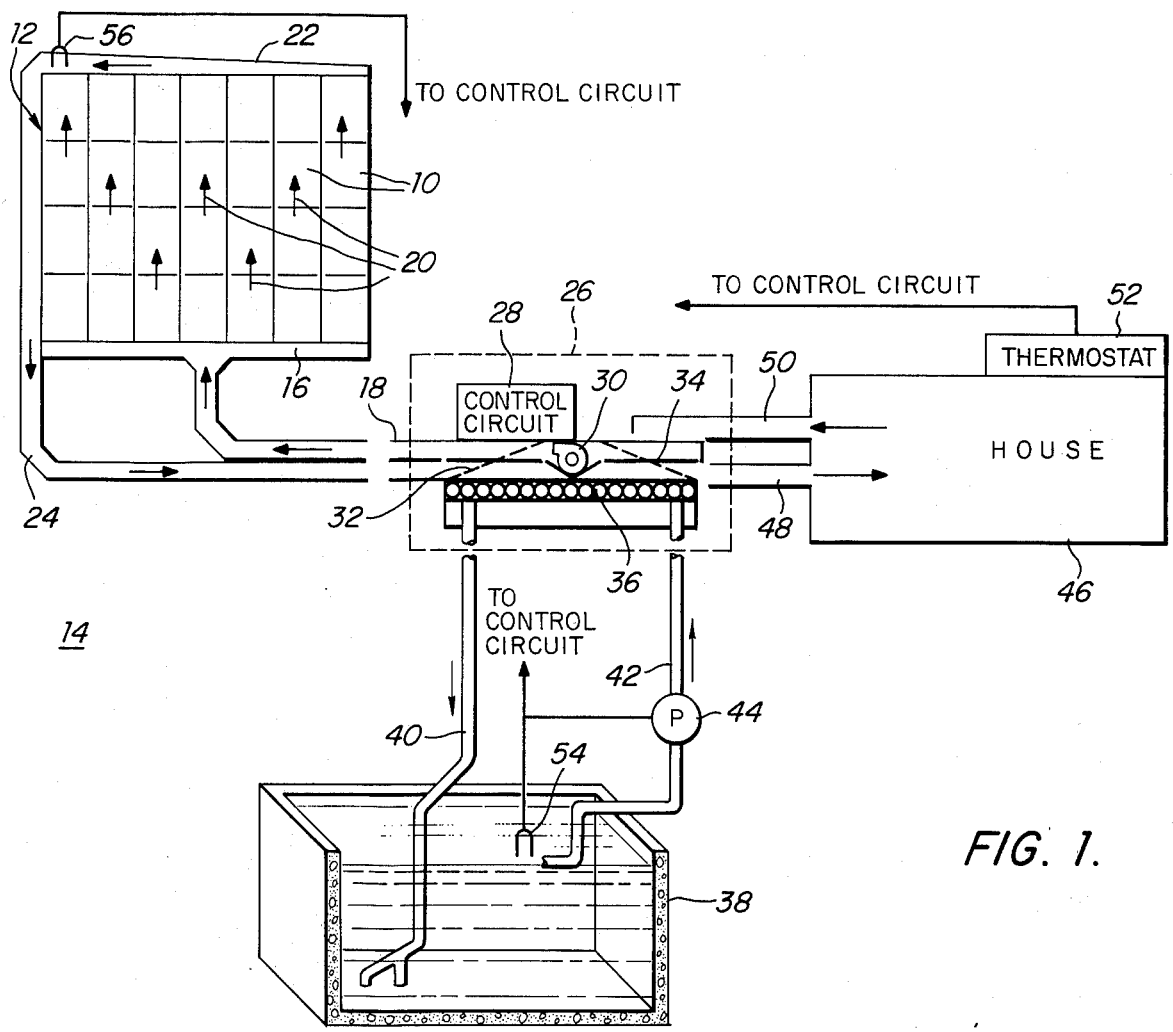
FIG. 1 is a schematic diagram of a solar heating system which uses solar collector units according to this invention.
FIG. 2 is an enlarged detailed axonometric diagrammatic view of a portion of a solar collector unit according to this invention.
FIG. 3 is a cross-sectional view taken along lines 3—3 of FIG. 2.

There is shown in FIG. 1 a plurality of solar collector units 10 arranged to form a solar collector system 12 forming a part of a solar heating system 14. Cold air manifold 16 fed by cold air duct 18 supplies cold air through the collector in the direction of arrows 20, which is then collected by hot air manifold 22 which feeds into duct 24.

The solar heating system 14 also includes a control unit 26 which includes a control circuit 28, blower 30, dampers 32, 34, and heat exchanger 36, which communicated with hot water storage tank 38 via input pipe 40, output pipe 42, and pump 44. Warm air is supplied to house 46 to be heated via conduit 48, and cold air is returned via conduit 50.

The temperature of the house is monitored by thermostat 52, that of the storage tank by sensor 54, and that of the collector by sensor 56.

In operation, air heated in solar collector system 12 is drawn from manifold 22 and duct 24 by blower 30, and is directed into house 46 by means of dampers 32 and 34.

When house 46 reaches a predetermined temperature as indicated by thermostat 52, dampers 32 and 34 are manipulated to direct the heated air introduced through duct 24 to heat exchanger 36. At this time pump 44 is turned on so that water from storage tank 38 is directed up through pipe 42, through the heat exchanger where it is warmed, and then returned through pipe 40 to storage tank 38. When due to cloudiness or sunset the sun is not available and sensor 56 indicates that solar collector system 12 is no longer providing heat at the desired temperature, a call for heat in house 46 by thermostat 52 turns on blower 30 and pump 44 and arranges dampers 32 and 34 so that cold air returned from the house is blown through heat exchanger 36, now being heated by warm water drawn from storage 38 by pump 44. The air is then returned through hot air duct 48 to heat the house 46. Solar collector unit 10 includes an insulation layer 60 covered with a reflecting surface 62 above which is suspended a corrugated absorber element 64 which contains selective coatings 66 and 68 on each side. The corrugated absorber is suspended by thin, low mass, low thermal conductivity isolating elements, 22ga. galvanized steel wires 70. Spaced above absorber element 64 is an inner glazing 72 an typically an outer glazing 74, which transmit the sun's rediation to absorber 64 but prevent heat transfer in the other direction. Insulation layer 60 and reflective surface 62 may be implemented by a rigid insulation such as Celotex "Technifoam TF-400", a rigid light-weight insulation board with an isocyanurate foam core and reflective aluminum faces on both sides, which has a density of about 1.9 pound/ft$^3$ and R factor of 9/inch. Absorber element 64 may be a one and one quarter inch thick deeply corrugated, selectively coated aluminum foil whose absorptivity is 0.9 to 1.0 and emissivity is 0.2. The absorptivity of the selectively coated aluminum foil absorber element 64 is increased by multiple reflections within the corrugations. When the sunlight strikes one side of the corrugation to a greater extent than the other, the heat is conducted to the darker side, maintaining a larger heat transfer area. Typically such sheets come in sections, 2 feet by 3 feet, and weigh approximately one pound. The selective coating 66 and 68 may be Alcoa 655. Inner glazing 72 may be Dupont "Tedlar" 400 BG 20TR Poly Vinyl Flouride film of .004 inch thickness, having a solar transmittance of 92% from 0.4 to 3.0 microns.

Outer glazing 74 may be the same material as the inner glazing 72 or may be Kalwall "Sun-Lite Premium" Fiberglass reinforced plastic sheet of 0.040 inch thickness having a solar transmittance of 85%.

The solar collector system includes a plurality of solar collector units 10 in which longitudinally abutting adjacent absorber elements are used. They are typically placed with their corrugations staggered relative to the adjacent absorber element to provide turbulent air flow in the corrugations and to prevent sliding one within the other of the successive corrugated elements placed vertically or at a sufficient inclination to cause the upper elements to shift, slide downward, and nest in corresponding corrugations of the lower elements. This can be seen in FIG. 2, where like parts have been given like numbers and similar parts like numbers accompanied by a lower case letter successively, beginning with a. There a second absorber element 64a constituting a second collector unit is shown with its corrugations staggered with respect to those of absorber element 64.

This staggered arrangement is shown more clearly in FIG. 3, where the end view clearly shows the staggering of the corrugations of elements 64 and 64a.

Figure 4:
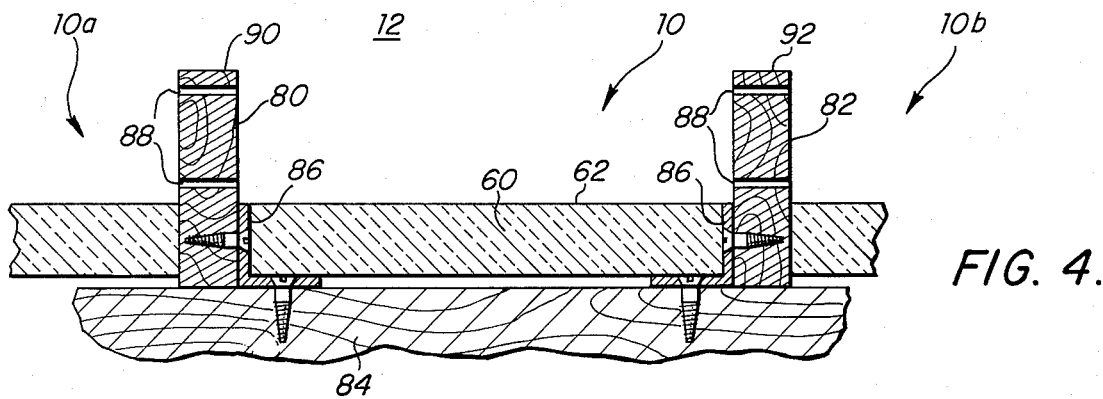
FIG. 4 is a schematic diagram similar to FIG. 3, omitting all but the insulation and showing the side members.

Preferably, insulation 60 and reflector surface 62 are mounted between side members or boards 80, 82, FIG. 4, which are fastened to the side or roof 84 of a conventional home by means of brackets 86 and suitable fastening means such as screws or nails. Members 80 and 82 have small holes 88 drilled in them to receive support wires 70 which suspend absorber element 64. In a collector system employing a number of collector units 10, member 80 may perform as part of adjacent collector unit 10a as well as collector unit 10, and member 82 may perform in the same way with respect to collector unit 10b.

Figure 5:
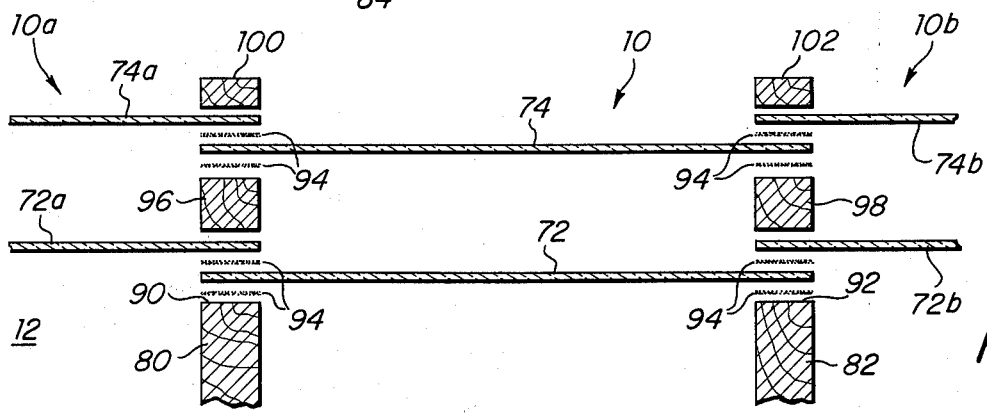
FIG. 5 is a schematic diagram showing the mounting of inner and outer glazings on the side members of a solar collector system which uses a plurality of solar collector units according to this invention.

The top surface 90 of member 80 and top surface 92 of member 82 support inner glazing 72, as seen more clearly in FIG. 5, where inner glazing 72 is cemented to the top surfaces 90 and 92 by means of adhesive 94, such as a transfer film adhesive for "Tedlar" glazing. Intermediate straps 96 and 98 have been placed on top of inner glazing 72 after an additional layer of adhesive 94. Outer glazing 74 is supplied in the same manner, finished off with cap straps 100 and 102, respectively. In collector systems having a number of laterally adjacent collector units such as shown in FIG. 5, laterally adjacent inner glazngs 72a, 72b, may be overlapped and join at the same point as inner glazing 72. This same construction is used for outer glazings 74a and 74b.

Figure 6:
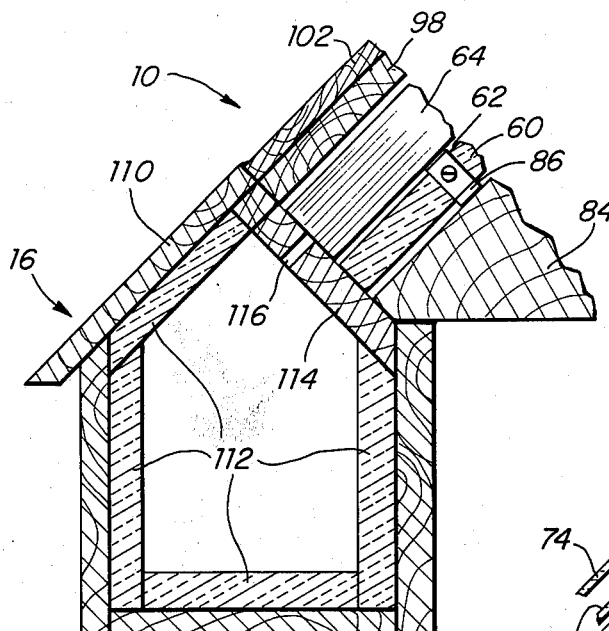
FIG. 6 is a diagrammatic cross-sectional view of a cold air input manifold.

Cold air input manifold 16, FIG. 6, abuts the lower end of a solar collector unit 10 or a solar collector system including a group of such units, and includes a frame 110 whose interior is covered by insulation 112. The portion of the inerface panel 114 of frame 110 which abuts the lower end of unit 10 includes an inlet slot 116 which is typically much narrower and not wider than the corrugation depth of absorber element 64. It typically has a gap width of approximately one-eigth inch for each 3 feet of absorber element length. Thus for collector system 12 as shown in FIG. 1, there are four three-foot absorber elements longitudinally aligned; the gap would be approximately 4/8 or ½ inch.

Figure 7:
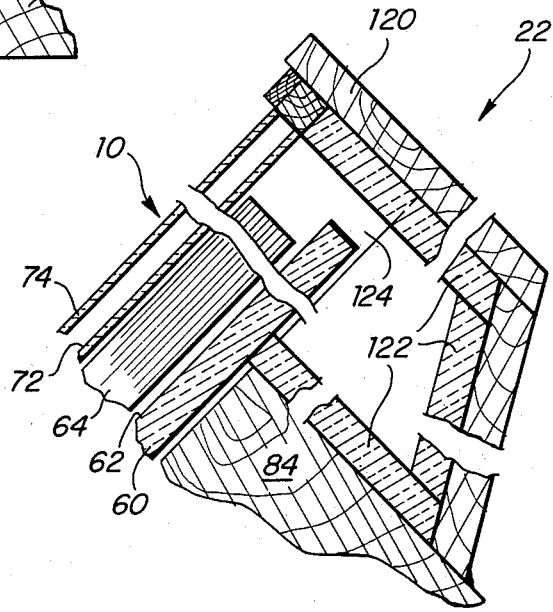
FIG. 7 is a cross-sectional diagram of a hot air output manifold.

Hot air manifold 22, FIG. 7, includes a frame 120 internally covered with insulation 122 and is provided with an opening 124 communicating with the upper end of collector unit 10. In FIGS. 6 and 7 the manifolds and collector units are illustrated as being mounted on a typical inclined roof of a conventional home. However, this is not a necessary limitation, as the apparatus may be mounted entirely vertically or horizontally or any other inclination with the geometry of the manifolds suitably rearranged to fit.

The frame 120 of hot air output manifold 22 of frame 110 and cold air input manifold 16, as well as the side members 80 and 82, intermediate straps 96 and 98, and cap straps 100 and 102 may be made of a good-quality wood such as Douglas fir without knots, finished clear with three coats of polyurethane varnish to protect it.

Other objects will occur to those skilled in the art and are within the following claims.

What is claimed is:

1. A solar collector unit comprising:
   a corrugated foil absorber element of low thermal mass;
   a reflectively selective coating on said absorber unit;
   a plurality of thin, low mass, low thermal conductivity, thermal isolating wire elements extending in a plane generally parallel to and beneath said absorber element for supporting said absorber element;
   an insulation medium spaced from and generally parallel to said absorber element, disposed on the bottom side of said absorber element;
   a reflector surface carried on said insulation medium between said bottom side and said medium; and
   an inner transparent insulating sheet spaced from and generally parallel to said absorber element disposed on the top side of said absorber for transmitting solar radiation to said absorber element and suppressing heat loss.

2. The solar collector unit of claim 1, further including a pair of side members, one disposed along each longiudinal edge of said absorber element for mounting said thermal isolation elements and said transparent insulation sheet.

3. The solar collector unit of claim 1 further including a cold air input manifold for introducing cool air to be heated to said absorber element longitudinally along both sides of said absorber element.

4. The solar collector unit of claim 1 further including a warm air output manifold for collecting heated air from said absorber element.

5. The solar collector unit of claim 1 further including a second outer transparent insulating sheet spaced from and generally parallel to said inner sheet and farther from said absorber element.

6. The solar collection unit of claim 3 in which said manifold includes a long narrow inlet slot for producing a smooth laminar flow along the inside of said inner transparent sheet and said reflector surface to provide an insulating barrier between the hotter turbulent air flow proximate said absorber element and the inner transparent sheet and reflector surface and improving transfer of heat between that turbulent air flow and the laminar flow.

7. A solar collector unit comprising:
a plurality of solar collector units, each including:
a corrugated foil absorber element of low thermal mass;
a reflectively selective coating on said absorber unit;
a plurality of thin, low mass, low thermal conductivity thermal isolating wire elements extending in a plane generally parallel to and beneath said absorber element for supporting said absorber element;
an insulation medium spaced from and generally parallel to said absorber element, disposed on the bottom side of said absorber element;
a reflector surface carried on said insulation medium between said bottom side and said medium; and medium; and
an inner transperant insulating sheet spaced from and gnerally parallel to said absorber element disposed on the top side of said absorber for transmitting solar radiation to said absorber element and suppressing heat loss.

8. The solar collector system of claim 7 in which longitudinally abutting adjacent absorber elements are disposed with their corrugations staggered relative to each adjacent absorber element to promote turbulent air flow in the corrugations.

* * * * *